(12) United States Patent
Guo et al.

(10) Patent No.: US 10,975,481 B2
(45) Date of Patent: Apr. 13, 2021

(54) CATHODE CATALYST, CATHODE MATERIAL USING THE SAME, AND REACTOR USING THE SAME

(71) Applicants: Tsinghua University, Beijing (CN); HON HAI PRECISION INDUSTRY CO., LTD., New Taipei (TW)

(72) Inventors: Jian-Wei Guo, Beijing (CN); Chen-Chen Zhao, Beijing (CN); Xiang-Ming He, Beijing (CN); Li Wang, Beijing (CN); Jian-Jun Li, Beijing (CN); Jian Gao, Beijing (CN)

(73) Assignees: Tsinghua University, Beijing (CN); HON HAI PRECISION INDUSTRY CO., LTD., New Taipei (TW)

( * ) Notice: Subject to any disclaimer, the term of this patent is extended or adjusted under 35 U.S.C. 154(b) by 88 days.

(21) Appl. No.: 16/509,620

(22) Filed: Jul. 12, 2019

(65) Prior Publication Data
US 2019/0338428 A1 Nov. 7, 2019

Related U.S. Application Data

(63) Continuation of application No. 13/792,214, filed on Mar. 11, 2013, now Pat. No. 10,400,340.

(30) Foreign Application Priority Data

Dec. 6, 2012 (CN) .......................... 201210517797.3

(51) Int. Cl.
*C25B 9/23* (2021.01)
*C25B 11/031* (2021.01)
(Continued)

(52) U.S. Cl.
CPC ............. *C25B 11/075* (2021.01); *B32B 15/01* (2013.01); *C25B 3/26* (2021.01); *C25B 9/23* (2021.01);
(Continued)

(58) Field of Classification Search
None
See application file for complete search history.

(56) References Cited

U.S. PATENT DOCUMENTS 3,657,102 A * 4/1972 Keith .................. C25B 11/0484
204/290.09
3,773,554 A * 11/1973 Scrutton ............. C25B 11/0484
427/126.5
(Continued)

OTHER PUBLICATIONS

Tamura etal, Study on the anode behavior of Sn and Sn—Cu alloy thin-film electrodes, Journal of Power Sources, vol. 107, No. 1, Apr. 2002, pp. 48-55 (Year: 2002).*
(Continued)

*Primary Examiner* — Harry D Wilkins, III
(74) *Attorney, Agent, or Firm* — ScienBiziP, P.C.

(57) ABSTRACT

A cathode catalyst used for conversion of a carbon dioxide gas by an electrochemical reduction includes at least one first catalyst layer and at least one second catalyst layer disposed on a surface of the at least one first catalyst layer. The at least one second catalyst layer is a porous structure. The at least one first catalyst layer and the at least one second catalyst layer are physically combined with each other, and materials of the at least one first catalyst layer and the at least one second catalyst layer are different. A cathode material and a reactor include the cathode catalyst are also provided.

19 Claims, 9 Drawing Sheets

(51) Int. Cl.
  *C25B 3/26* (2021.01)
  *C25B 3/25* (2021.01)
  *C25B 11/057* (2021.01)
  *C25B 11/081* (2021.01)
  *C25B 11/075* (2021.01)
  *B32B 15/01* (2006.01)

(52) U.S. Cl.
  CPC .......... *C25B 11/031* (2021.01); *C25B 11/057* (2021.01); *C25B 11/081* (2021.01); *C25B 3/25* (2021.01)

(56) References Cited

U.S. PATENT DOCUMENTS

| | | | | |
|---|---|---|---|---|
| 4,003,817 A | * | 1/1977 | Bianchi | C25B 1/46 204/290.03 |
| 4,233,340 A | * | 11/1980 | Saito | C25B 11/0478 427/125 |
| 4,267,025 A | * | 5/1981 | de Nora | C25B 11/0484 204/290.12 |
| 4,456,518 A | * | 6/1984 | Bommaraju | C25B 11/0478 204/290.08 |
| 4,921,586 A | * | 5/1990 | Molter | C25B 3/04 204/263 |
| 5,879,827 A | * | 3/1999 | Debe | C23C 14/205 429/524 |
| 2003/0159922 A1 | * | 8/2003 | Miley | H01L 35/00 204/290.03 |
| 2009/0092887 A1 | * | 4/2009 | McGrath | H01M 4/8657 429/421 |
| 2011/0151322 A1 | * | 6/2011 | Joo | H01M 4/134 429/209 |
| 2013/0048506 A1 | * | 2/2013 | Chen | C25B 11/035 205/317 |
| 2013/0105304 A1 | * | 5/2013 | Kaczur | C25B 3/04 204/237 |

OTHER PUBLICATIONS

Wang et al, All-Metal Layer-by-Layer Films: Bimetallic Alternate Layers with Accessible Mesopores for Enhanced Electrocatalysis, Journal of the American Chemical Society, vol. 134, No. Jun. 26, 2012, p. 10819-10821 (Year: 2012).*

Wang et al, Electrochemical reduction of $CO_2$ to formate catalyzed by electroplated tin coating on copper foam, Applied Surface Science, vol. 362, Dec. 2015 (first available online), pp. 394-398 (Year: 2015).*

"Mesoporous material" from Wikipedia, available at https://en.wikipedia.org/wiki/Mesoporous_material, accessed on Dec. 4, 2020 (Year: 2020).*

* cited by examiner

CATHODE CATALYST, CATHODE MATERIAL USING THE SAME, AND REACTOR USING THE SAME

CROSS-REFERENCE TO RELATED APPLICATIONS

This application is a continuation application of U.S. patent application Ser. No. 13/792,214, filed on Mar. 11, 2013, entitled, "CATHODE CATALYST, CATHODE MATERIAL USING THE SAME, AND REACTOR USING THE SAME", now U.S. Pat. No. 10,400,340, which claims all benefits accruing under 35 U.S.C. § 119 from China Patent Application No. 201210517797.3, filed on Dec. 6, 2012, in the China National Intellectual Property Administration, the contents of which are hereby incorporated by reference.

BACKGROUND

1. Technical Field

The present disclosure relates to a cathode catalyst, a cathode material, and a reactor including the same. The cathode catalyst is used for a conversion of a $CO_2$ gas by an electrochemical reduction.

2. Description of Related Art

Carbon dioxide ($CO_2$) is considered the main anthropogenic cause of climate change, such as the greenhouse effect. Converting $CO_2$ to useful industrial chemicals containing carbon or fuels is a proper way for realizing a sustainable development of energy and environment.

Ways of converting $CO_2$ include chemical conversion, biochemical conversion, photochemical reduction, electrochemical reduction, and inorganic transformation. The advantages of electrochemical reduction of $CO_2$ include low cost, simple fabrication system, and mild operation condition.

Efficiency for the electrochemical reduction of $CO_2$ is affected by the performance of cathode catalysts. Metal catalyst particles with one kind of metal and alloy catalyst particles are commonly used as the cathode catalysts. However, these kinds of catalysts have low reaction activity, and a hydrogen evolution occurs during the process of the electrochemical reduction of $CO_2$. These disadvantages result a low conversion efficiency of $CO_2$.

What is needed, therefore, is to provide cathode catalysts, cathode materials, and reactors using the same, which have good reaction activities and can improve $CO_2$ electrochemical conversion.

BRIEF DESCRIPTION OF THE DRAWING

Many aspects of the present disclosure can be better understood with reference to the following drawings. The components in the drawings are not necessarily to scale, the emphasis instead being placed upon clearly illustrating the principles of the present embodiments.

DETAILED DESCRIPTION

The disclosure is illustrated by way of example and not by way of limitation in the figures of the accompanying drawings in which like references indicate similar elements. It should be noted that references to "another," "an," or "one" embodiment in this disclosure are not necessarily to the same embodiment, and such references mean at least one.

Figure 1:
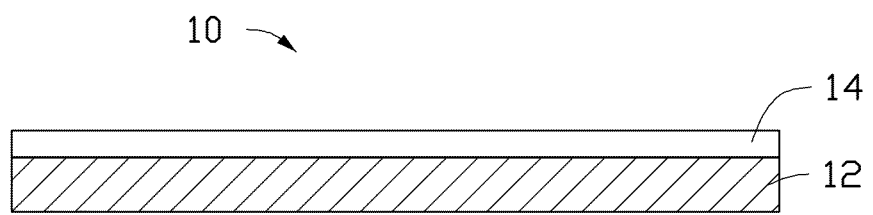
FIG. 1 is a schematic side view of a structure of one embodiment of a cathode catalyst.

Referring to FIG. 1, one embodiment of a cathode catalyst 10, used for a conversion of a $CO_2$ gas by an electrochemical reduction, includes a first catalyst layer 12 and a second catalyst layer 14. The second catalyst layer 14 is disposed on a surface of the first catalyst layer 12. The second catalyst layer 14 is a porous structure.

The first catalyst layer 12 can be a plate structure having a uniform thickness. The thickness of the first catalyst layer 12 can be in a range from about 100 nanometers to about 200 micrometers. The first catalyst layer 12 can be a free standing structure. "Free standing" is an intrinsic structural characteristic of the first catalyst layer 12. The term "free standing" means that the first catalyst layer 12 can sustain the weight of itself when it is hoisted by a portion thereof without any significant damage to its structural integrity. The first catalyst layer 12 can be continuous. A surface of the continuous first catalyst layer 12 is uniform and dense. The first catalyst layer 12 can also be porous. A porosity of the porous first catalyst layer 12 can be in a range from about 30% to about 90%. In one embodiment, the first catalyst layer 12 is continuous.

A material of the first catalyst layer 12 can be a catalytic metal for the electrochemical reduction of the $CO_2$ gas. The material of the first catalyst layer 12 can be zinc, cadmium, indium, tin, lead, bismuth, palladium, platinum, copper, silver, or gold. In one embodiment, the material of the first catalyst layer 12 is copper.

Figure 2:
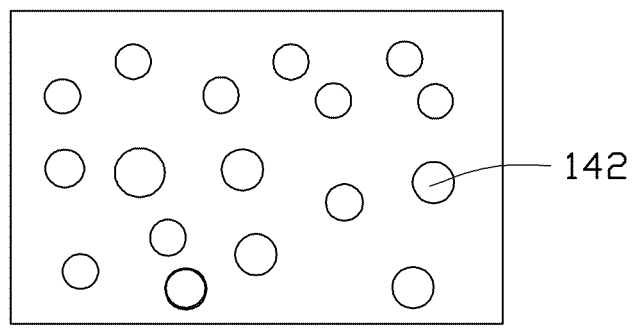
FIG. 2 is a schematic view of a structure of a second catalyst layer of the cathode catalyst.

Referring to FIG. 2, the second catalyst layer 14 is the porous structure having a uniform thickness. A plurality of micropores 142 are uniformly defined on a surface of the second catalyst layer 14. The plurality of micropores 142 can be through holes or blind holes. In one embodiment, the plurality of micropores 142 are through holes. Shapes of the plurality of micropores 142 can be circular or rectangular. Diameters of the plurality of micropores 142 can be in a range from about 10 nanometers to about 10 micrometers. A porosity of the second catalyst layer 14 can be in a range from about 40% to about 90%. In one embodiment, the porosity of the second catalyst layer 14 is in a range from about 60% to about 90%. The porous structure can be formed by patterning methods. A contact area between the $CO_2$ gas and the cathode catalyst 10 can be increased due to the porous structure during the process for the electrochemical reduction of the $CO_2$ gas. Therefore, a reaction activity and a stability of the cathode catalyst 10 can be improved. The thickness of the second catalyst layer 14 can be in a range from about 100 nanometers to about 5 micrometers.

A material of the second catalyst layer 14 also can be a catalytic metal for electrochemical reduction of the $CO_2$ gas. In one embodiment, the material of the second catalyst layer 14 is different from the material of the first catalyst layer 12. In one embodiment, the material of the second catalyst layer 14 is tin.

The first catalyst layer 12 and the second catalyst layer 14 are tightly combined with each other. The first catalyst layer 12 and the second catalyst layer 14 are physically combined with each other. The term "physically combined" means that the first catalyst layer 12 and the second catalyst layer 14 are combined with each other only by inter-atomic forces or intermolecular forces. There is no chemical bond formed between the first catalyst layer 12 and the second catalyst layer 14. In other words, the first catalyst layer 12 and the second catalyst layer 14 are not combined with each other in an alloy form. There is a good synergistic effect in the combining interface between the first catalyst layer 12 and the second catalyst layer 14 that are physically combined. Therefore, a catalytic efficiency of the cathode catalyst 10 can be increased and a hydrogen evolution can be effectively suppressed during the conversion process of electrochemical reduction of the $CO_2$ gas. Accordingly, the conversion efficiency of the $CO_2$ gas can be increased.

Figure 3:
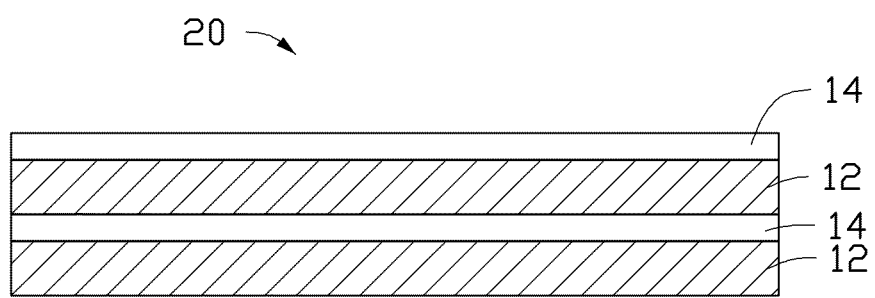
FIG. 3 is a schematic side view of a structure of another embodiment of a cathode catalyst.

Referring to FIG. 3, one embodiment of a cathode catalyst 20, used for the conversion of the $CO_2$ gas by the electrochemical reduction is provided. The cathode catalyst 20 is similar to the cathode catalyst 10 excepted that the cathode catalyst 20 includes at least one of a plurality of the first catalyst layers 12, a plurality of the second catalyst layers 14, and combinations thereof. Adjacent two catalyst layers in the cathode catalyst 20 use different materials. Each catalyst layer is physically combined with adjacent catalyst layer in the cathode catalyst 20. In one embodiment, the cathode catalyst 20 includes a plurality of first catalyst layers 12 and a plurality of second catalyst layers 14. The plurality of first catalyst layers 12 and the plurality of second catalyst layers 14 are stacked with each other. In one embodiment, the plurality of first catalyst layers 12 and the plurality of second catalyst layers 14 are alternately stacked with each other. Each of the plurality of first catalyst layers 12 contacts and is physically combined with at least one of the plurality of second catalyst layers 14. Each of the plurality of second catalyst layers 14 contacts and is physically combined with at least one of the plurality of first catalyst layers 12. In one embodiment, the plurality of first catalyst layers 12 are stacked with each other to form a first integrating catalyst layer, the plurality of second catalyst layers 14 are stacked with each other to form a second integrating catalyst layer, and the second integrating catalyst layer is disposed on a surface of the first integrating catalyst layer to form the cathode catalyst 20.

The cathode catalysts 10 and 20 can be made by various methods as long as at least one catalyst layer is the porous structure, and two adjacent catalyst layers use different materials and are physically combined with each other. One embodiment of a method for making the cathode catalyst 10 includes the following steps:

S1, preparing an electroplating solution;
S2, selecting a first catalyst plate as an electroplating cathode and a second catalyst material as an electroplating anode, wherein materials of the first catalyst plate and the second catalyst material are different;
S3, electroplating the second catalyst material on a surface of the first catalyst plate in the electroplating solution to form a plating on the surface of the first catalyst plate; and
S4, drying the first catalyst plate with the plating to form the cathode catalyst 10.

In step S1, the electroplating solution can be formed by the following sub steps:
S11, providing a complex agent and a tartrate;
S12, forming a mixed solution by mixing the complex agent and the tartrate; and
S13, adding a main salt containing an element of the second catalyst material to the mixed solution to form the electroplating solution.

In step S11, the complex agent can be a pyrophosphate. In one embodiment, the complex agent is a water solution of a potassium pyrophosphate. The tartrate can facilitate a dissolution of the electroplating anode and stabilize ions of the second catalyst material dissociated during the electroplating. In one embodiment, the tartrate is potassium sodium tartrate.

A molar ratio of the complex agent to the tartrate can be in a range from about 3:1 to about 20:1. In one embodiment, the molar ratio is in a range from about 5:1 to about 20:1. In one embodiment, the molar ratio is about 8:1.

The method can further include a substep of adding an additive in the mixed solution to increase a poling efficiency of the electroplating cathode, thereby the plating with uniform and delicate crystalline grains can be formed during the electroplating. An amount of additive can be in a range from about 0.2 grams per liter (g/L) to about 0.6 g/L. In one embodiment, the additive is gelatin.

In step S12, a surfactant further can be added to the mixed solution. The surfactant can decrease an interfacial tension between the electroplating cathode, electroplating anode, and the electroplating solution. A scattered ability of the electroplating solution on surfaces of the electroplating cathode and electroplating anode thereby can be improved. In one embodiment, the surfactant is sodium dodecyl benzene sulfonate (SDBS).

The complex agent, tartrate, additive, and surfactant are physically mixed and dissolved in the mixed solution, with no chemical reaction occurring between them. The mixed solution is a liquid.

In step S13, the main salt contains the element of the second catalyst material. The main salt can dissociate the ions of the second catalyst material in the mixed solution. In one embodiment, the main salt is a tin salt wherein the tin element is bivalent. The tin salt can be tin chloride ($SnCl_2$). A molar ratio between the tin salt and the complex agent can be in a range from about 3:1 to about 6:1. In one embodiment, the molar ratio is about 4:1.

In step S1, the electroplating solution is prepared in a temperature lower than 40 degrees Celsius. In one embodiment, the temperature for preparing the electroplating solution is in a range from about 5 degrees Celsius to about 15 degrees Celsius.

In step S2, the first catalyst plate can be the first catalyst layer 12 or materials of the first catalyst plate and the first catalyst layer 12 can be the same. In addition, the second catalyst material is the material of the second catalyst layer 14. In one embodiment, the first catalyst plate is a copper plate and the second catalyst material is metallic tin. The metallic tin can be plate shaped or block shaped. In one embodiment, the metallic tin as the electroplating anode is block shaped. The first catalyst plate can be a layered structure with a dense and continuous surface. The first catalyst plate can be a net structure.

In step S3, the electroplating is processed under a temperature lower than 60 degrees Celsius. In this temperature range, the plating with a uniform thickness can be formed and the plating can be tightly and physically combined with the first catalyst plate.

In step S3, the plating defines a plurality of micropores. The plating is the second catalyst layer 14. The electroplating is processed under a constant current density. The current density can be in a range from about 5 milliamperes per square centimeter ($mA/cm^2$) to about 30 $mA/cm^2$. In one embodiment, the current density is in a range from about 10 $mA/cm^2$ to about 15 $mA/cm^2$. A time period for the electroplating can be in a range from about 1 minute to about 50 minutes. In one embodiment, the time period is in a range from about 10 minutes to about 25 minutes. The cathode catalyst 10 formed in the time period and current density ranges exhibits good catalytic activity.

In step S4, the first catalyst plate with the plating thereon can be air dried or heat dried under a low temperature. The first catalyst plate with the plating should avoid being dried or heat treated under a high temperature. In one embodiment, a temperature for drying is lower than 60 degrees Celsius.

Figure 4:
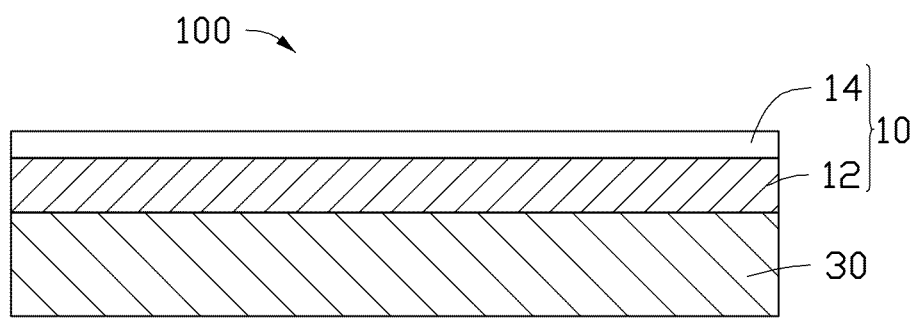
FIG. 4 is a schematic side view of a structure of one embodiment of a cathode material.

Referring to FIG. 4, one embodiment of a cathode material 100 includes the cathode catalyst 10 and a conductive support layer 30. The cathode catalyst 10 is disposed on a surface of the conductive support layer 30.

The conductive support layer 30 can be a porous layered structure. The porous layered structure defines a plurality of through holes. The conductive support layer 30 has a certain thickness, which gives the cathode material 100 a three-dimensional structure. The thickness of the conductive support layer 30 can be in a range from about 2 millimeters to about 30 millimeters. In one embodiment, the thickness of the conductive support layer 30 is in a range from about 2.1 millimeters to about 20 millimeters. The proton transfer rate and an electron transfer rate during the electrochemical reduction of the $CO_2$ gas can be increased for the conductive support layer 30 with a certain thickness. In one embodiment, the through holes are all curvy cylinders to increase contact areas between the cathode catalyst 10 and reactants. A material of the conductive support layer 30 can be a metal or alloy resistant to corrosion, such as titanium or stainless steel.

In one embodiment, the cathode material 100 is a free standing structure consisting of the cathode catalyst 10 or 20.

Figure 5:
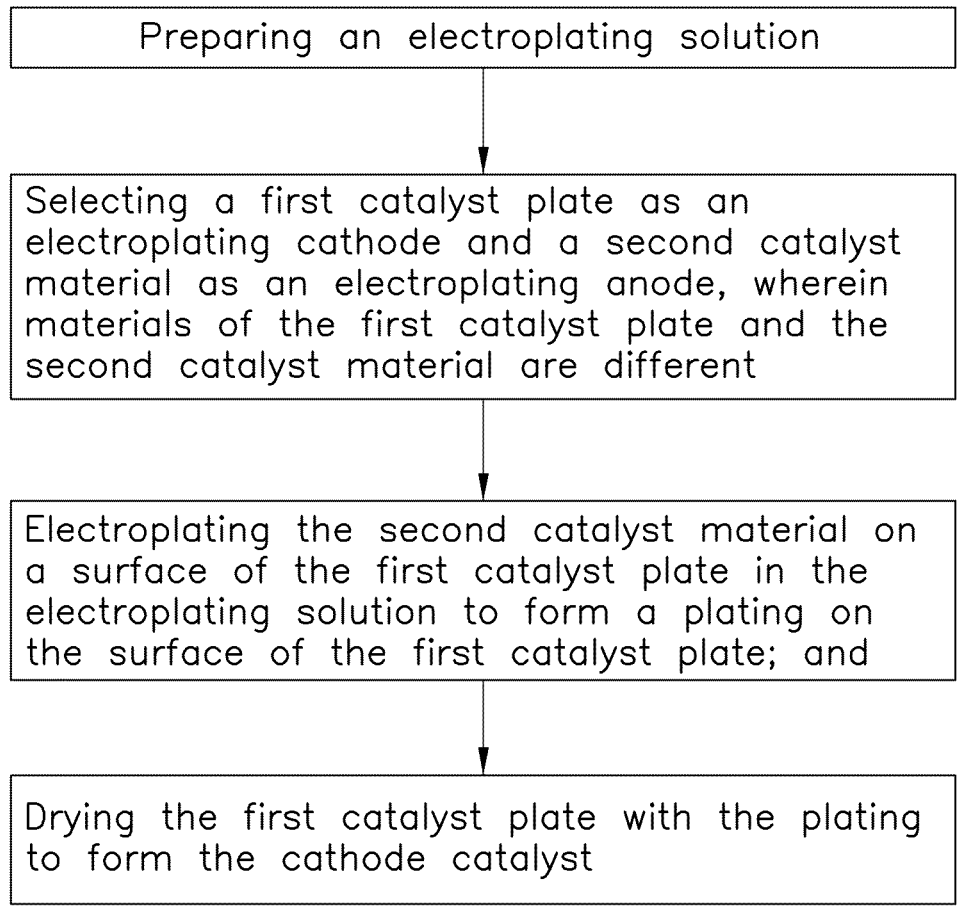
FIG. 5 is a flowchart of one embodiment of a method for making the cathode material.

Referring to FIG. 5, for the free standing cathode catalyst 10 or 20, the cathode material 100 can be made by the above method.

Figure 6:
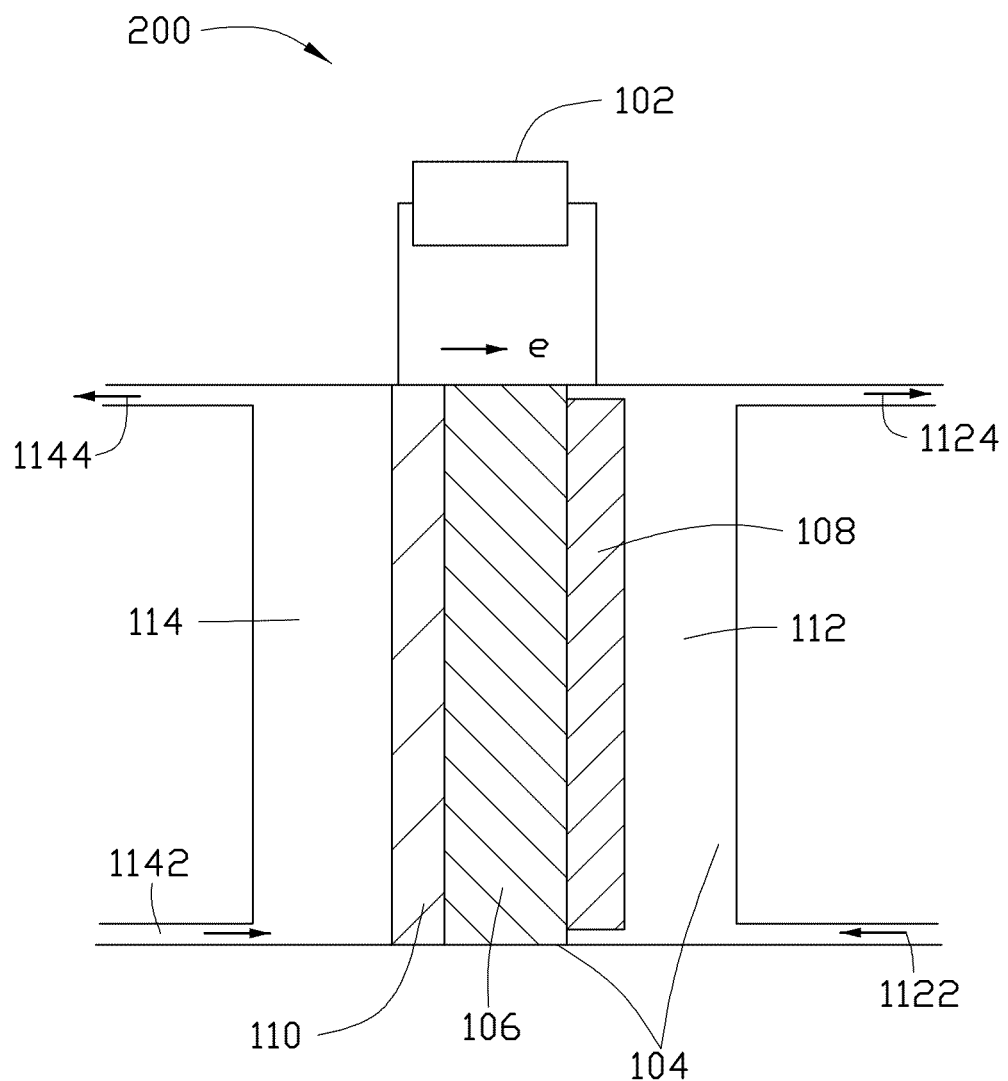
FIG. 6 is a schematic view of a structure of one embodiment of a reactor.

Referring to FIG. 6, one embodiment of a reactor 200, used for the conversion of the $CO_2$ gas by the electrochemical reduction, includes a power source 102, a cavity 104, a solid electrolyte separator 106, a cathode 108, and an anode 110. The solid electrolyte separator 106 is disposed in the cavity 104. The cavity 104 is divided into two chambers by the solid electrolyte separator 106 which are defined as a cathode chamber 112 and an anode chamber 114. The cathode 108 is disposed in the cathode chamber 112. The anode 110 is disposed in the anode chamber 114. The cathode 108 and the anode 110 are separated by the solid electrolyte separator 108. The power source 102 is disposed outside the cavity 104. The power source 102 has a positive electrode and a negative electrode. The positive electrode of the power source 102 is electrically connected with the cathode 108, and the negative electrode is electrically connected with the anode 110. The cathode 108 includes the cathode material 100.

The power source 102 is used to provide an electrolytic voltage for the electrochemical reduction of the $CO_2$ gas. Wind energy, photovoltaic energy, or electrochemical energy can be used as the power source 102.

The cathode 108, solid electrolyte separator 106, and the anode 110 are stacked in order. The solid electrolyte separator 106 can be an enhanced cation exchange membrane, such as an enhanced perfluoro sulfonate membrane, enhanced perfluorocarboxylic acid membrane, or a composite membrane thereof.

The cathode 108 includes the cathode material 100. In one embodiment, the cathode 108 is the cathode material 100 consisting of the cathode catalyst 10. The first catalyst layer 12 is disposed between the second catalyst layer 14 and the solid electrolyte separator 106.

The cathode chamber 112 further includes a cathode inlet 1122 and a cathode outlet 1124. The cathode inlet 1122 is disposed at a bottom of the cavity 102. A cathode electrolyte and the $CO_2$ gas are concurrently fed from the cathode inlet 1122 and undergo an electrochemically reducing reaction in the cathode chamber 112 to form cathode reaction products. The cathode reaction products are flowed out along with the rest of the cathode electrolyte from the cathode outlet 1124.

In one embodiment, the anode 110 is a porous diffusion electrode including a porous diffusion layer and an anode catalyst layer disposed on a surface of the porous diffusion layer. The anode catalyst layer is disposed between the porous diffusion layer and the solid electrolyte separator 106.

The anode chamber 114 further includes an anode inlet 1142 and an anode outlet 1144. The anode inlet 1142 is disposed at a bottom of the anode chamber 114. An anode electrolyte and anode active materials can be fed from the anode inlet 1142 and undergo an electrochemical oxidation reaction to form anode reaction products. The anode reaction products are flowed out along with the rest of the anode electrolyte from the anode outlet 1144.

One embodiment of a method for electrochemically converting the $CO_2$ gas includes the following steps:

B1, feeding the $CO_2$ gas into the reactor 200; and

B2, applying the electrolytic voltage between the cathode 108 and the anode 110 to decompose the $CO_2$ gas.

The step B1 further includes steps of feeding the cathode electrolyte and the $CO_2$ gas into the cathode chamber 112 and flowing through the cathode 108 and at the same time, continuously feeding the anode electrolyte and the anode active material into the anode chamber 114.

The cathode electrolyte includes a first solvent and a first solute dissolved in the first solvent. The first solute can be at least one of an alkali metal bicarbonate, alkali metal formate, ammonium bicarbonate, and ammonium formate. The alkali metal bicarbonate can be at least one of sodium bicarbonate, potassium bicarbonate, and a hydrate thereof. The alkali metal formate can be at least one of sodium formate, potassium formate, and a hydrate thereof. The first solvent can be water. In one embodiment, the cathode electrolyte is potassium bicarbonate water solution.

The anode electrolyte includes a second solvent and a second solute dissolved in the second solvent. The second solvent can be water. The second solute can be an alkali metal hydroxide, alkali salt, ammonium salt, or an acid. In one embodiment, the second solute can be sodium hydroxide, sodium sulfate, ammonium sulfate, or sulfuric acid. The anode active material can be the same as the second solute.

In step B2, the electrolytic voltage can be in a range from about 2 V to about 5 V. In one embodiment, the electrolytic voltage is in a range from about 2.8 V to about 3.5 V. After the electrolytic voltage is applied, an electrochemical oxidation reaction is continuously conducted, and an electrochemical reduction is continuously conducted to decompose the CO2 gas to form expected products. The expected products can be useful organic substances.

EXAMPLE

Preparation of the Cathode Catalyst 10

Step 1: preparation of the electroplating solution is provided. About 0.4 mol of the potassium pyrophosphate is dissolved in about 800 ml of deionized water, stirred and ultrasonically vibrated for about half an hour to form a water solution of the potassium pyrophosphate. About 0.05 mol of potassium sodium tartrate, about 0.5 g of gelatin, and about 0.1 g of SDBS are dissolved in the water solution of the potassium pyrophosphate to form the mixed solution. About 0.1 mol of $SnCl_2$ is added to the mixed solution at about 25 degrees Celsius, stirred and ultrasonically vibrated until the SnCl2 is totally dissolved in the mixed solution to form the electroplating solution.

Figure 7:
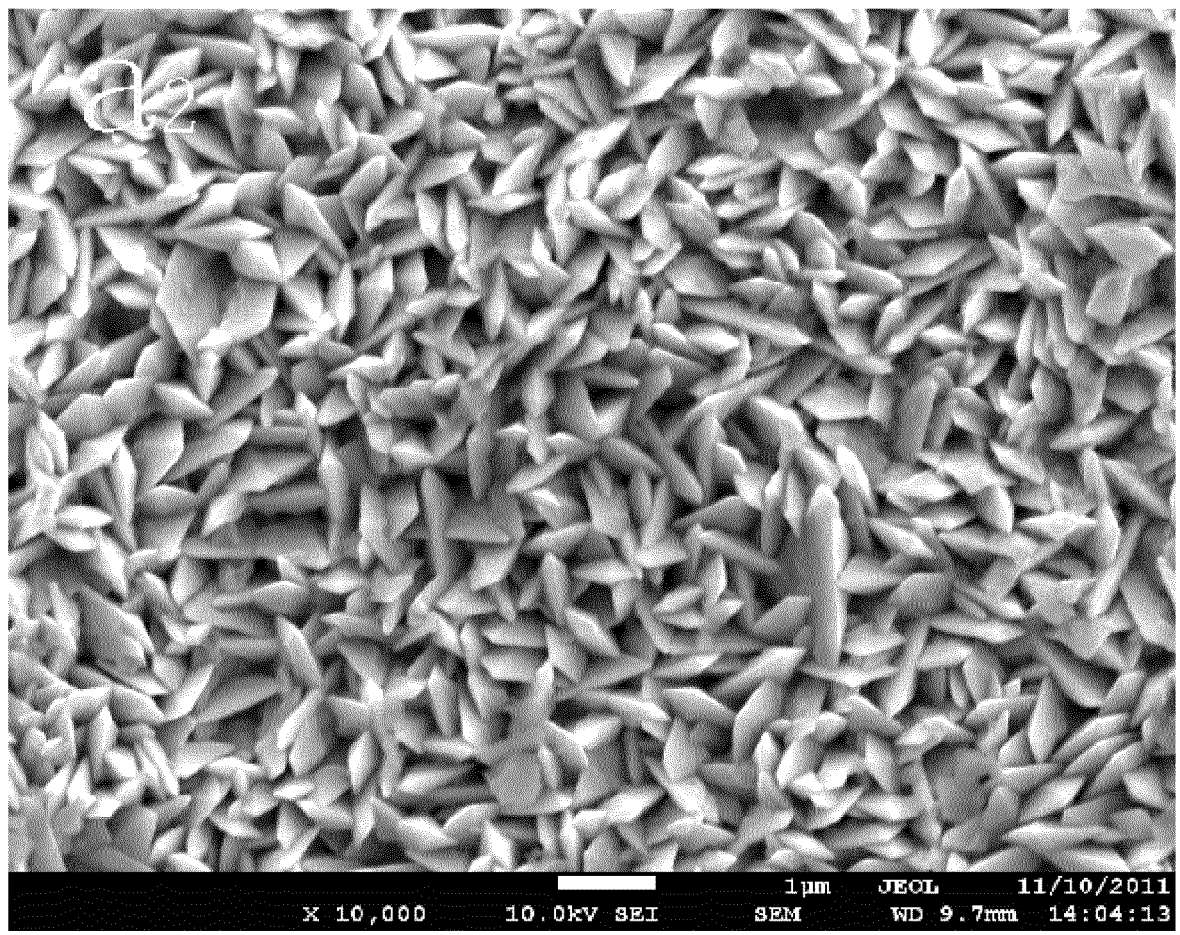
FIG. 7 shows a scanning electron microscope image of a tin catalyst layer of a Sn—Cu cathode catalyst.

Step 2: electroplating process. A smooth copper foil of about 20 micrometers thickness and about 99.9% of purity is decontaminated in an acetone and activated in a diluted hydrochloric acid. A tin ingot as the electroplating anode and the copper foil as the electroplating cathode are electroplated in a constant current density to form a plated copper foil. The plated copper foil is washed by the deionized water and dried in an oven at a temperature of about 60 degrees Celsius to achieve a Sn—Cu cathode catalyst. A porous tin layer is physically disposed on a surface of the copper foil. Referring to FIG. 7, holes are uniformly distributed in the tin layer.

Cathode catalysts under different electroplating current densities and electroplating time periods are provided below. These cathode catalysts are directly used as the cathodes for converting the $CO_2$ gas by the electrochemical reduction (without the conductive support layer). The performance of the cathodes for the converting the $CO_2$ gas by the electrochemical reduction are tested.

Figure 8:
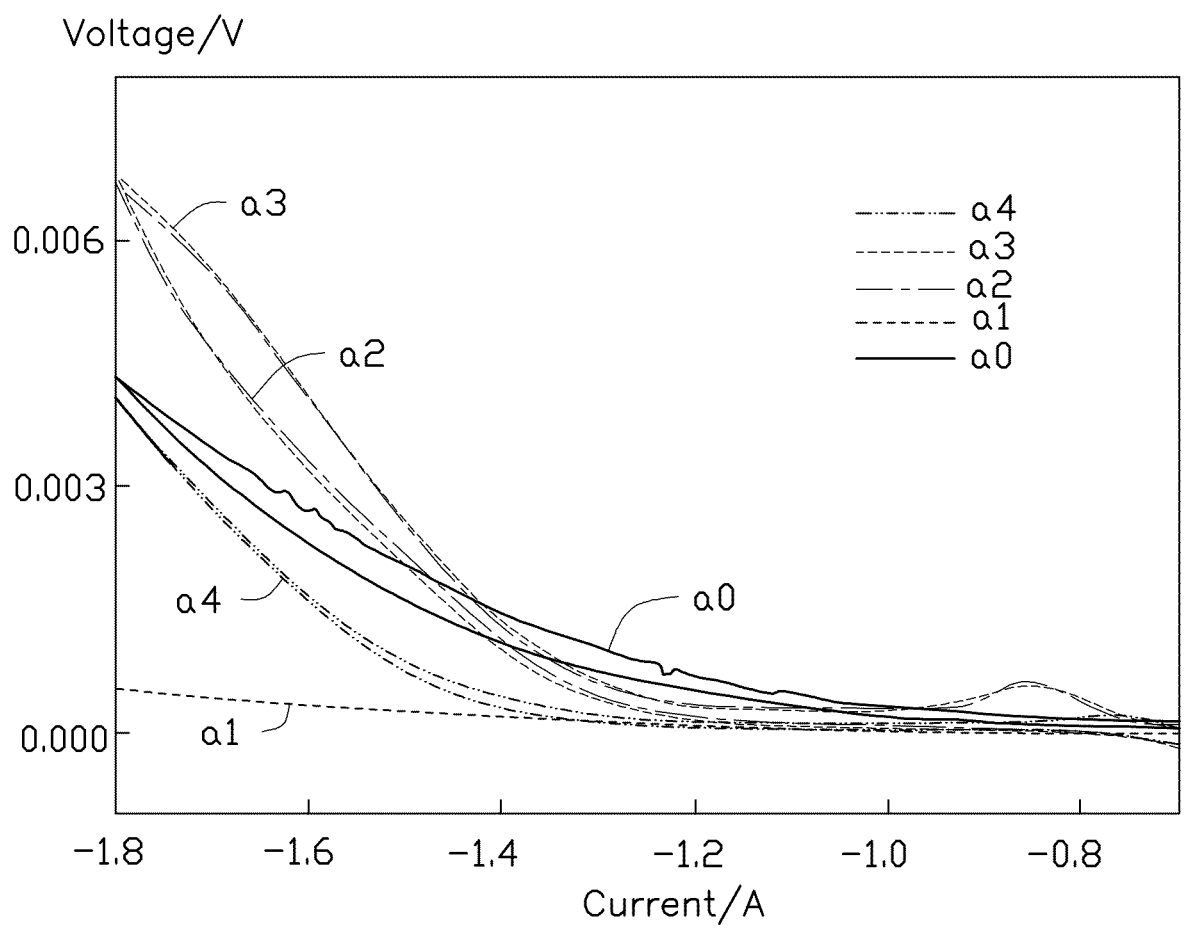
FIG. 8 is a comparative plot showing volt-ampere characteristic curves of the Sn—Cu cathode catalyst fabricated in different current densities of the electroplating.

Referring to FIG. 8, four samples of the Sn—Cu cathode catalysts $a_1$, $a_2$, $a_3$, and $a_4$ are prepared under different electroplating current densities to be used as Sn—Cu cathodes. The sample $a_0$ is the copper foil without any electroplating. Referring to table 1, five cathodes fabricated by the samples are tested using a cyclic voltammetry method to test activities and stabilities thereof. A test result shows that the Sn—Cu cathodes fabricated under the electroplating current densities of about 10 mA/cm$^2$ and 15 mA/cm$^2$ have good activities and stabilities for conversion the $CO_2$ gas by the electrochemical reduction. Especially, the Sn—Cu cathode fabricated under the electroplating current density of about 15 mA/cm$^2$ has the best catalytic activity and stability.

TABLE 1

| samples | current density (mA/cm$^2$) | time period for electroplating (minute) |
|---|---|---|
| $a_0$ | 0 | 0 |
| $a_1$ | 5 | 10 |
| $a_2$ | 10 | 10 |
| $a_3$ | 15 | 10 |
| $a_4$ | 20 | 10 |

Figure 9:
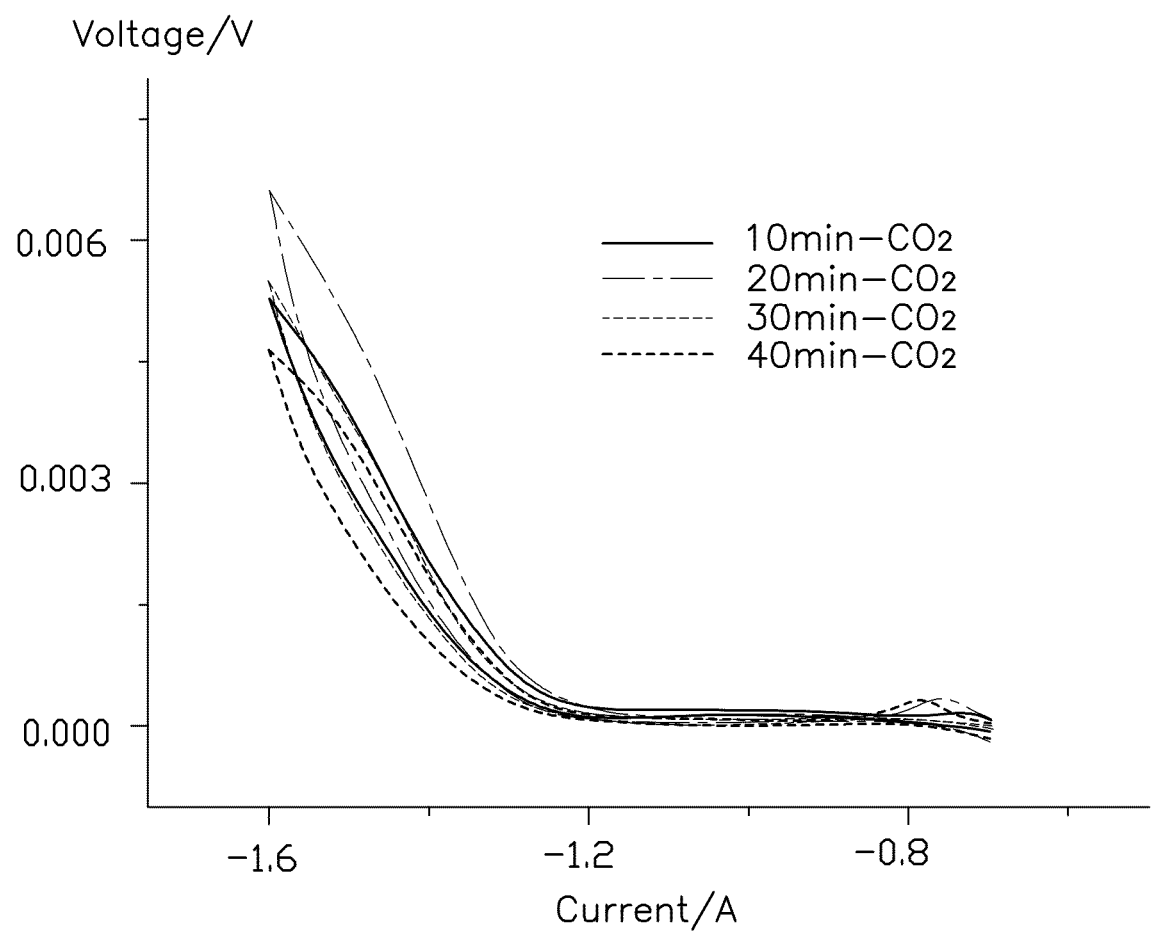
FIG. 9 is a comparative plot showing volt-ampere characteristic curves of the Sn—Cu cathode catalyst fabricated in different time periods of the electroplating.

Referring to FIG. 9, Sn—Cu cathodes fabricated under a constant current density of about 5 mA/cm2 and in different time periods of the electroplating are further tested. The result shows that the Sn—Cu cathode has good catalytic activity and stability when the electroplating lasts for about 20 minutes.

In addition, the Sn—Cu cathode catalysts 10 directly as cathode are applied in the reactor 200 to convert the $CO_2$ gas by electrochemical reduction. A test result shows that a current efficiency of the reactor 200 reaches 90% and a conversion efficiency of the $CO_2$ gas reaches 92%.

Comparative Example 1

A Sn—Cu alloy layer as a first comparative cathode catalyst, in which a Sn metal layer and a Cu metal layer are chemically combined as a way of alloy, is provided. A first comparative reactor using the Sn—Cu alloy layer is used to convert the CO2 gas by the electrochemical reduction. The first comparative reactor is similar to the reactor 200 except that the cathode catalyst is different. In addition, conversion conditions of the first comparative reactor and the reactor 200 are the same. A test result shows that a current efficiency of the first comparative reactor is about 80% and a conversion efficiency of the $CO_2$ gas is about 80%.

Comparative Example 2

Comparative Example 2 is similar to the Comparative Example 1 except that Sn—Cu alloy particles are used as a second comparative cathode catalyst for a second comparative reactor. A test result shows that a current efficiency of the second comparative reactor is about 82% nd a conversion efficiency of the $CO_2$ gas is about 85%.

Depending on the embodiment, certain steps of methods described may be removed, others may be added, and the sequence of steps may be altered. It is also to be understood that the description and the claims drawn to a method may include some indication in reference to certain steps. However, the indication used is only to be viewed for identification purposes and not as a suggestion as to an order for the steps.

Finally, it is to be understood that the above-described embodiments are intended to illustrate rather than limit the present disclosure. Variations may be made to the embodiments without departing from the spirit of the present disclosure as claimed. Elements associated with any of the above embodiments are envisioned to be associated with any other embodiments. The above-described embodiments illustrate the scope of the present disclosure but do not restrict the scope of the present disclosure.

What is claimed is:

1. A reactor adapted for conversion of a carbon dioxide gas by an electrochemical reduction, the reactor comprising:
   a cavity;
   a solid electrolyte separator disposed in the cavity and dividing the cavity into a cathode chamber and an anode chamber;
   an anode disposed in the anode chamber; and
   a cathode comprising a cathode catalyst and disposed in the cathode chamber, the cathode catalyst comprising:
      a plurality of first catalyst layers, wherein each of the plurality of first catalyst layers is a single integral and continuous gapless layer; and
      a plurality of second catalyst layers being porous, wherein a material of the plurality of first catalyst layers is different from a material of the plurality of second catalyst layers; the material of the plurality of first catalyst layers is selected from the group consisting of zinc, cadmium, indium, tin, lead, bismuth, palladium, platinum, copper, silver, and gold; and the plurality of first catalyst layers and the plurality of second catalyst layers are alternately stacked on each other.

2. The reactor of claim 1, wherein the anode is a porous diffusion electrode comprising a porous diffusion layer and an anode catalyst layer disposed on a surface of the porous diffusion layer.

3. The reactor of claim 1, wherein a porosity rate of the plurality of second catalyst layers is in a range from approximately 40% to approximately 90%.

4. The reactor of claim 1, wherein a plurality of micropores are defined in the plurality of second catalyst layers, and diameters of the plurality of micropores are in a range from approximately 10 nanometers to approximately 10 micrometers.

5. The reactor of claim 1, wherein thicknesses of the plurality of first catalyst layers are in a range from approximately 100 nanometers to approximately 200 micrometers.

6. The reactor of claim 1, wherein the material of the plurality of second catalyst layers is selected from the group consisting of zinc, cadmium, indium, tin, lead, bismuth, palladium, platinum, copper, silver, and gold.

7. The reactor of claim 1, wherein each of the plurality of first catalyst layers is a copper foil, and the material of the plurality of second catalyst layers is tin.

8. The reactor of claim 1, wherein the cathode catalyst consists of a plurality of copper foils and a plurality of tin layers.

9. The reactor of claim 1, wherein each of the plurality of first catalyst layers is a single integral and continuous gapless copper foil.

10. A reactor adapted for conversion of a carbon dioxide gas by an electrochemical reduction, the reactor comprising:
    a cavity;
    a solid electrolyte separator disposed in the cavity and dividing the cavity into a cathode chamber and an anode chamber;
    an anode disposed in the anode chamber; and
    a cathode comprising a cathode catalyst and disposed in the cathode chamber, the cathode catalyst comprising:
        a plurality of first catalyst layers, wherein each of the plurality of first catalyst layers is a single integral and continuous gapless copper foil; and
        a plurality of second catalyst layers, wherein a material of the plurality of first catalyst layers is different from a material of the plurality of second catalyst layers.

11. The reactor of claim 10, wherein the plurality of first catalyst layers and the plurality of second catalyst layers are alternately stacked on each other.

12. The reactor of claim 10, wherein a porosity rate of the plurality of second catalyst layers is in a range from approximately 40% to approximately 90%.

13. The reactor of claim 10, wherein a plurality of micropores are defined in the plurality of second catalyst layers, and diameters of the plurality of micropores are in a range from approximately 10 nanometers to approximately 10 micrometers.

14. The reactor of claim 10, wherein the material of the plurality of first catalyst layers is selected from the group consisting of zinc, cadmium, indium, tin, lead, bismuth, palladium, platinum, copper, silver, and gold.

15. The reactor of claim 10, wherein the material of the plurality of second catalyst layers is selected from the group consisting of zinc, cadmium, indium, tin, lead, bismuth, palladium, platinum, copper, silver, and gold.

16. The reactor of claim 10, wherein each of the plurality of first catalyst layers is a copper foil, and the material of the plurality of second catalyst layers is tin.

17. The reactor of claim 10, wherein the cathode catalyst consists of a plurality of copper foils and a plurality of tin layers.

18. A reactor adapted for conversion of a carbon dioxide gas by an electrochemical reduction, the reactor comprising:
    a cavity;
    a solid electrolyte separator disposed in the cavity and dividing the cavity into a cathode chamber and an anode chamber;
    an anode disposed in the anode chamber; and
    a cathode comprising a cathode catalyst and disposed in the cathode chamber, the cathode catalyst comprising:
        a plurality of copper foils; and
        a plurality of tin layers being porous.

19. The reactor of claim 18, wherein the plurality of copper foils and the plurality of tin layers are alternately stacked on each other.

* * * * *